(12) United States Patent
Linardi et al.

(10) Patent No.: US 7,306,287 B2
(45) Date of Patent: Dec. 11, 2007

(54) TRANSLATION MOVEMENT GUIDANCE MECHANISM WITH POSITIONAL LOCKING, FOR ADJUSTABLE ELEMENTS OF AN AUTOMOBILE VEHICLE SEAT

(75) Inventors: Mathieu Linardi, Gentilly (FR); Herve Chaussemy, Ormoy (FR)

(73) Assignee: Faurecia Sieges d'automobile (FR)

( * ) Notice: Subject to any disclaimer, the term of this patent is extended or adjusted under 35 U.S.C. 154(b) by 53 days.

(21) Appl. No.: 11/345,719

(22) Filed: Feb. 2, 2006

(65) Prior Publication Data
US 2006/0186720 A1 Aug. 24, 2006

(30) Foreign Application Priority Data
Feb. 4, 2005 (FR) .................. 05 01111

(51) Int. Cl.
*A47C 1/10* (2006.01)
(52) U.S. Cl. .................................. 297/410
(58) Field of Classification Search ........... 297/408, 297/410, 411.36, 440.24; 403/322.2, 325; 292/163, 169, 150
See application file for complete search history.

(56) References Cited

U.S. PATENT DOCUMENTS

| | | | |
|---|---|---|---|
| 3,295,812 A | | 1/1967 | Schneider et al. |
| 3,563,602 A | * | 2/1971 | Ohta et al. .................. 297/410 |
| 3,572,831 A | * | 3/1971 | Barecki et al. ........ 297/344.21 |
| 3,578,384 A | * | 5/1971 | Leichtl ........................ 297/410 |
| 4,600,240 A | * | 7/1986 | Suman et al. ............... 297/408 |
| 4,671,573 A | * | 6/1987 | Nemoto et al. ............. 297/410 |
| 4,674,796 A | * | 6/1987 | Weinich et al. ............. 297/391 |
| 4,978,169 A | * | 12/1990 | Shannon et al. ............ 297/410 |
| 6,607,242 B2 | * | 8/2003 | Estrada et al. ......... 297/216.12 |
| 2004/0145228 A1 | * | 7/2004 | Terrand et al. ............. 297/410 |
| 2006/0214491 A1 | * | 9/2006 | Metz et al. ................. 297/410 |

FOREIGN PATENT DOCUMENTS

| | | |
|---|---|---|
| EP | 1 203 692 A2 | 5/2002 |
| FR | 2 803 563 A1 | 7/2001 |
| FR | 2 848 932 A1 | 6/2004 |
| GB | 2 278 772 A | 12/1994 |

* cited by examiner

*Primary Examiner*—Sarah B McPartlin
(74) *Attorney, Agent, or Firm*—Bachman & LaPointe

(57) ABSTRACT

The translation movement guidance mechanism with positional locking includes a stem and one or more bushes sliding in relation to the stem, the bushes being attached to a support plate which extends parallel to the stem and a locking component which includes two bearing elements more or less parallel and arranged so that, in a locking position of the locking component, they exert a gripping force on two diametrically opposite sides of the stem. The bushes are arranged so that the stem can be installed on the support plate in an assembly direction perpendicular to the support plate and the locking component includes, between the two bearing elements, a recess allowing the insertion of the stem into the recess simultaneously with the installation of the stem on the support plate. The translation movement guidance mechanism could be applied to adjustable elements of an automobile vehicle seat, especially the headrests.

9 Claims, 5 Drawing Sheets

TRANSLATION MOVEMENT GUIDANCE MECHANISM WITH POSITIONAL LOCKING, FOR ADJUSTABLE ELEMENTS OF AN AUTOMOBILE VEHICLE SEAT

BACKGROUND OF THE INVENTION (1) Field of the Invention

The present invention relates to a translation movement guidance mechanism with positional locking especially for adjustable elements of an automobile vehicle seat.

(2) Prior Art

A typical example of the application of such a mechanism is the installation of a height adjustable headrest for such a seat, but such a mechanism can also be used, for example, for adjusting the length of the seat cushion, adjusting the length of an armrest, etc.

For the height adjustment of a headrest, a system of stems which slide in guide bushes is commonly used. The stems can be attached to the headrest and slide in fixed bushes at the top of the backrest or the stems can be attached to the backrest or at least securely held at the top of the backrest and then the headrest includes bushes which slide over the stems.

Such a system also includes relative positional locking means to, on the one hand, ensure that the headrest is held in the position selected by the user, to improve user's comfort, and, on the other hand, to ensure that the neck of the passenger is supported if the vehicle is subjected to a shock.

For example, notch adjustment systems are known in which a lock in fixed position in relation to the bushes engages with notches made in the stems. The lock and notch system can be arranged in the form of a ratchet lock to enable easy adjustment by simply pulling the headrest upwards but allowing downwards movement of the headrest only by a voluntary unlocking operation to prevent the headrest from moving downwards in the case of an accident. A notch system does not allow continuous positional adjustment and, in addition, requires the making of notches on the stems which increases the cost.

Other systems known, for example by FR-2803563, US-2002/0038969, FR-2833052, allow continuous adjustment, the locking being generally obtained by jamming or buttressing: a thin blade, hinged along an axis offset and orthogonal in relation to that of the stem, or a flexible blade, includes a hole through which the stem passes with sufficient clearance to allow it to slide when the blade is placed in a position more or less perpendicular to the stem; however, when the blade, which comprises the locking component, is held inclined, it blocks the stem in its position, the diametrically opposite edges of the hole forming more or less parallel bearing elements which exert a gripping force on two diametrically opposite sides of the stem. The locking force is increased when a higher sliding force is applied, due to the resulting buttressing effect of the blade.

These systems have however the disadvantage of causing aggressive engagement of the edge of the locking blade hole with the stem, which over time damages the surface of the stem.

Another problem comes from the fact that the stems are not always straight and, in particular, they can sometimes be significantly elbowed for reasons of seat installation and or required headrest sliding direction.

It then becomes difficult, if not impossible, to pass the stems through the guide bushes when installing the headrest. For example, a headrest may be installed on a U-folded tube, on U bottom side, which is therefore placed upside down. The arms of the U, facing downwards, comprise the two stems the lower ends of which are attached to the upper part of the backrest. The height adjustment of the headrest is obtained by the sliding of the headrest over the said stems which are fixed in relation to the backrest. In such a case, it becomes impossible to install the headrest on the stems by sliding it from their free ends when the stems are elbowed for example near their centres.

Similar problems can occur in sliding seat or armrest element assemblies as stated previously.

SUMMARY OF THE INVENTION

The aim of the present invention is to solve the various problems mentioned above in particular to enable easy assembly of a translation movement guidance mechanism using at least one stem sliding in one or more bushes, when the said stems are not straight, in particular elbowed. Its aim is also to allow continuous positional adjustment over a desired zone along the stems. It also aims in obtaining efficient locking in all adjustment positions profiting, especially, from a buttressing effect of the locking elements and making the contact between the said locking elements and the stem or stems less aggressive.

With these targets in mind, the subject of the invention is a translation movement guidance mechanism with positional locking, especially for adjustable elements of an automobile vehicle seat, including at least one stem and one or more bushes sliding in relation to the stem, the bushes being attached to a support plate which extends parallel to the stem, and locking means, in fixed position in relation to the bushes, including a locking component which includes two bearing elements more or less parallel and arranged so as to, in a locking position of the locking component, exert a gripping force on two diametrically opposite sides of the stem.

According to the invention, the guidance mechanism is characterised in that the bush or bushes is/are arranged so that the stem can be installed on the support plate in an assembly direction perpendicular to the said support plate and the locking component includes, between the two bearing elements, a recess allowing the insertion of the stem into the said recess simultaneously with the installation of the stem on the support plate.

Thus, for the assembly of the mechanism, the support plate, bearing the preassembled locking means, can be inserted laterally on the stem or vice versa. It is therefore no longer necessary to insert the stem or stems into the bushes and the locking components via the ends of the stems and to slide them up to their in-service position and, consequently, it becomes possible to use bent or elbowed stems whilst ensuring easy assembly of the mechanism.

Except the specific features according to the invention, of the ability of inserting the stem laterally within the bushes and said recess of the locking component, the general locking principle remains similar to that which was described previously in relation with the prior art allowing continuous positional adjustment of the support plate in relation to the stems.

According to a preferred embodiment, the bush or bushes are elastically deformable split bushes so that they can be inserted laterally over the stem, the recess of the locking component being aligned with the split zone of the bushes and made in such a manner to allow the insertion of the stem into the said recess at the same time as it is inserted into the bushes.

The assembly is especially easy as the insertion of the stems into the split bushes is achieved simply by clipping and requires no specific tools.

Again, preferably, the locking component consists of a rigid metallic wire having an hinge, installed so as to pivot in relation to the support plate along an orthogonal axis and offset laterally in relation to the axis of the stem, the wire being bent in such a way as to comprise the said recess between the two parallel parts forming the bearing elements and flexible means acting on the wire to hold it in an inclined position in relation to the stem. The locking is obtained in this way, the two said parallel parts gripping the stem between them.

When an unlocking component acts on the wire against the force of the flexible means to place it in a position more perpendicular to the stem the gripping force that it exerts on the stem is reduced and thus allows the relative sliding of the support plate in relation to the stem.

Conversely, in the case where the mechanism has been submitted to a force tending to make the support plate slide over the stem, when it is in its locked position, and in the direction increasing the inclination of the wire, it results from the friction between the wire and the stem a buttressing force which increases as the sliding force increases. Thus, for a headrest mechanism application for example, in the case of an accident strongly forcing the head of the passenger in the seat onto the headrest, downwards, sturdy locking of the headrest is ensured.

Preferably, the section of the wire comprising the locking component is rounded. Therefore, even in the case of a substantial gripping force of the wire on the stem, risks of damage to the surface of the stem are minimised.

According to specific arrangements of the invention:
the wire is installed so as to pivot by an hinge mounted on a slider guided on the support plate transversally to the axis of the stem and the flexible means are arranged so as to push the slide towards the stem, this maintaining the locking wire in inclined position, the inclination being limited only by the contact of the two bearing zones with the stem,
the mechanism includes unlocking means, arranged so as to push the end of the wire opposite to its hinge onto the slider in the direction tending to bring the wire perpendicular to the axis of the stem,
unlocking means include an unlocking blade installed so as to slide on the support plate perpendicular to the axis of the stem and including an oblique ramp acting on the end of the wire to move it in the axial direction of the stem,
the mechanism includes a knob acting on the end of the unlocking blade to perform unlocking and a spring returning the unlocking blade to the locking position.

In the unlocked position, caused by the unlocking blade bearing on the end of the wire, the bearing element, located nearest the end of the wire comprising its hinge, remains in contact with the stem but the second bearing element is disengaged from the stem or at least does not exert a significant bearing force on it, which allows the stem to slide. Friction subsists between the first bearing element and the stem but this friction generates a resistance to sliding much lower than the resistance created when the two bearing elements grip the stem and especially it cannot cause buttressing.

According to an embodiment variant, the locking component includes a rocker hinged on the support plate and the bearing elements are formed by two pins attached to the rocker and parallel to its pivoting axis and it includes elastic means acting on the rocker to apply the pins against the stem. As in the first embodiment, this variant allows the mechanism to be assembled by approaching the support plate and the stem transversally. The locking is obtained by the pins gripping the stem under the effect of the torque transmitted to the rocker by the elastic means. Unlocking means can act on the rocker opposing the elastic means to pivot it in the direction cancelling the bearing force of the pins on the stem and, consequently, allowing the relative sliding movement to be ensured.

The object of the invention is also a specific application of the mechanism defined above to an automobile vehicle seat headrest.

Other features and advantages will become apparent on reading the following description of such a headrest and an embodiment variant of the invention.

BRIEF DESCRIPTION OF THE DRAWINGS

The description refers to the accompanying drawings, in which.

DETAILED DESCRIPTION OF THE PREFERRED EMBODIMENT(S)

Figure 1:
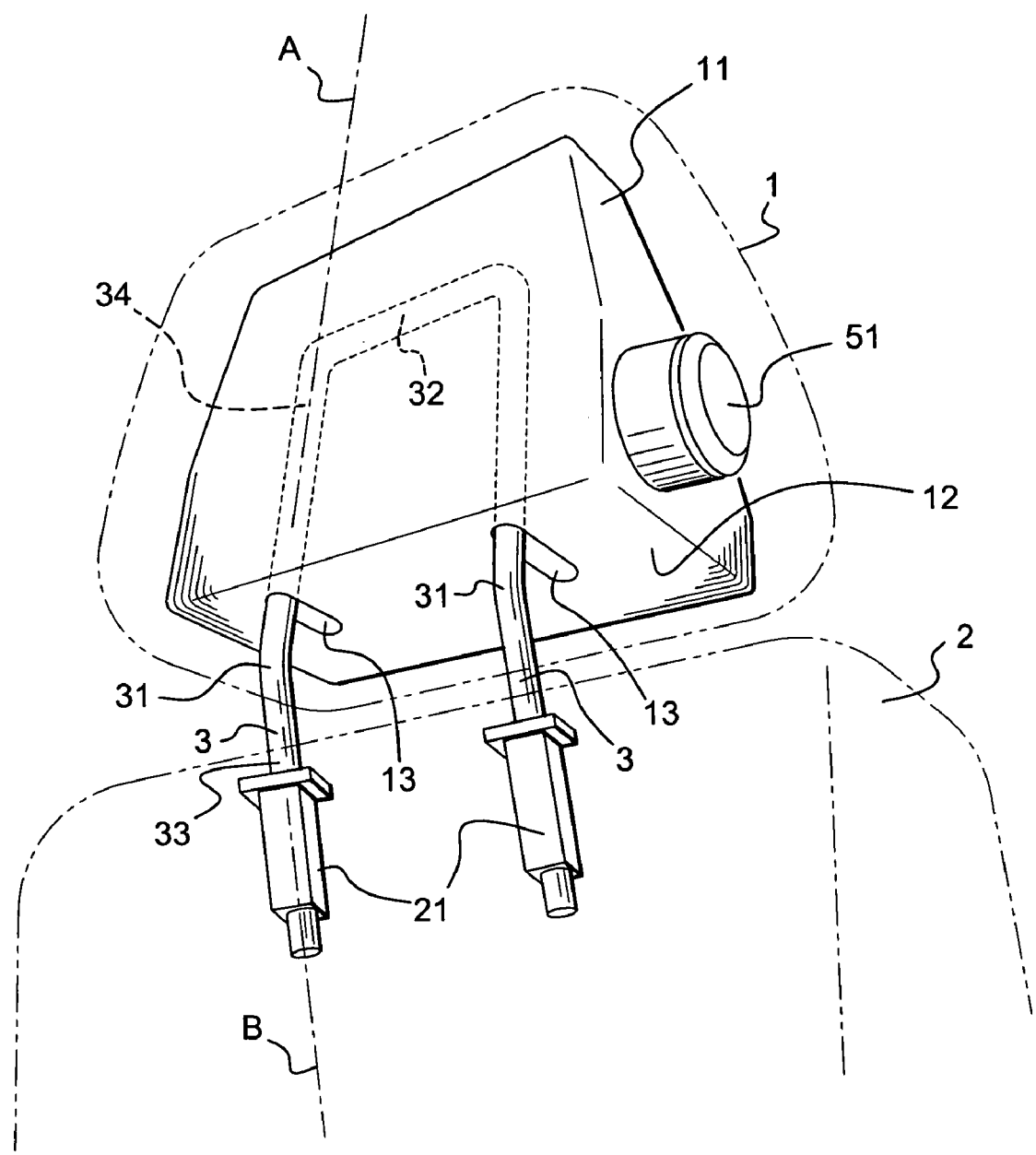
FIG. 1 is an overall perspective view of the-headrest.
Figure 2:
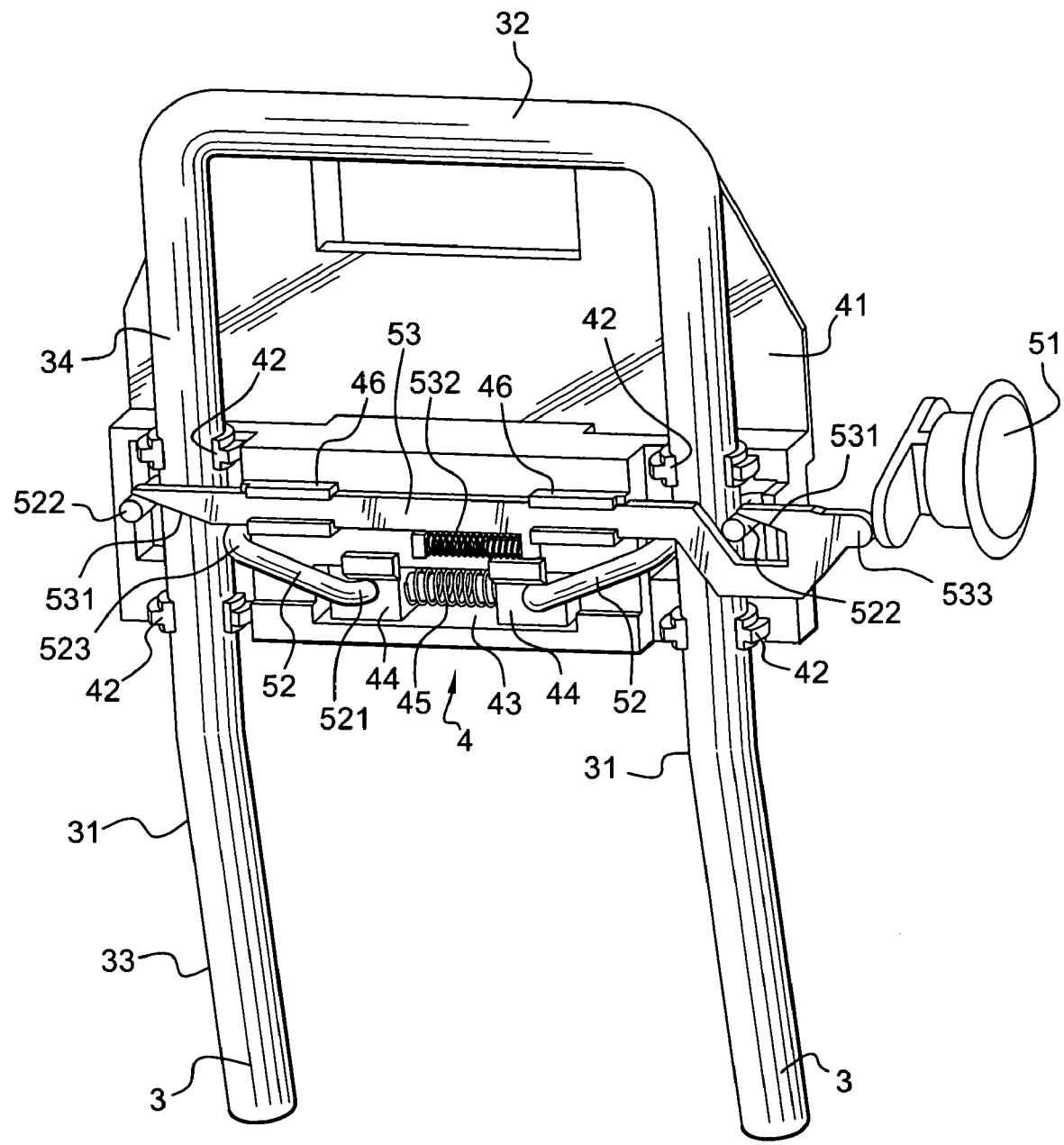
FIG. 2 is a view of the guidance and locking mechanism integrated into the headrest.

FIG. 1 illustrates, on a rear perspective view, the headrest 1 installed on the top of the backrest 2 of an automobile seat, by means of two stems 3, of more or less circular section, the lower ends 33 of which are attached to the backrest in fixed bushes 21. The headrest slides on the stems 3 by means of the mechanism, subject of the invention, which will be described in detail later, and which is integrated into a casing 11 covered by the padding of the headrest. The casing 11 is equipped with a lower cover plate 12 in which holes 13 are made to allow the stems 3 to pass through and also includes, on a lateral wall, an unlocking knob 51.

It can be seen that the stems 3 include, more or less at mid-length, a bend 31, to allow the headrest to slide over the upper part 34 of the stems in an axial direction A, which is inclined in relation to direction B of the lower part 33.

Moreover, the stems are connected at their upper ends by a horizontal section 32 which remains integrated within the casing 11 irrespective of the adjustment position of the headrest.

The guidance and locking mechanism 4 includes a support plate 41 which overall extends parallel to the stems 3. The support plate 41 includes, for each stem 3, a set of two elastically deformable split guide bushes 42 which are fixed, for example by clipping by means of notches 421, in housings 411 of the said support plate 41. The two sides of the split in the bushes 42 can therefore elastically move apart to allow the stems 3 to be inserted laterally along assembly direction F1, as this will be easily understood.

Moreover, a housing 43, extending perpendicularly to the direction A of the stems, is made in the support plate 41 to accommodate two sliders 44 between which flexible return means are placed, consisting of a spring 45, which tends therefore to push the sliders towards the stems 3.

Figure 3:
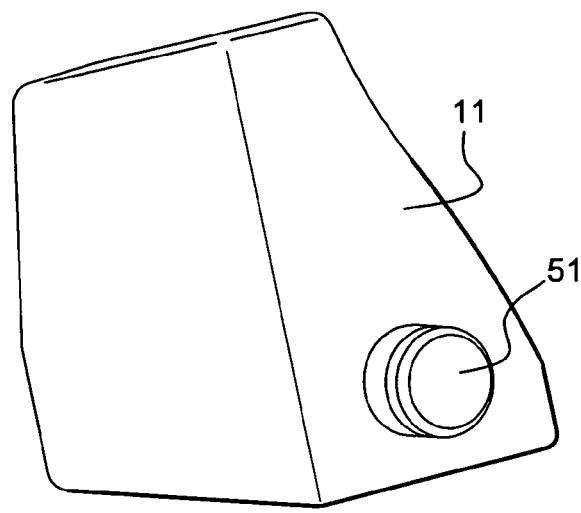
FIG. 3 is an exploded view of the various elements comprising the mechanism.
Figure 3:
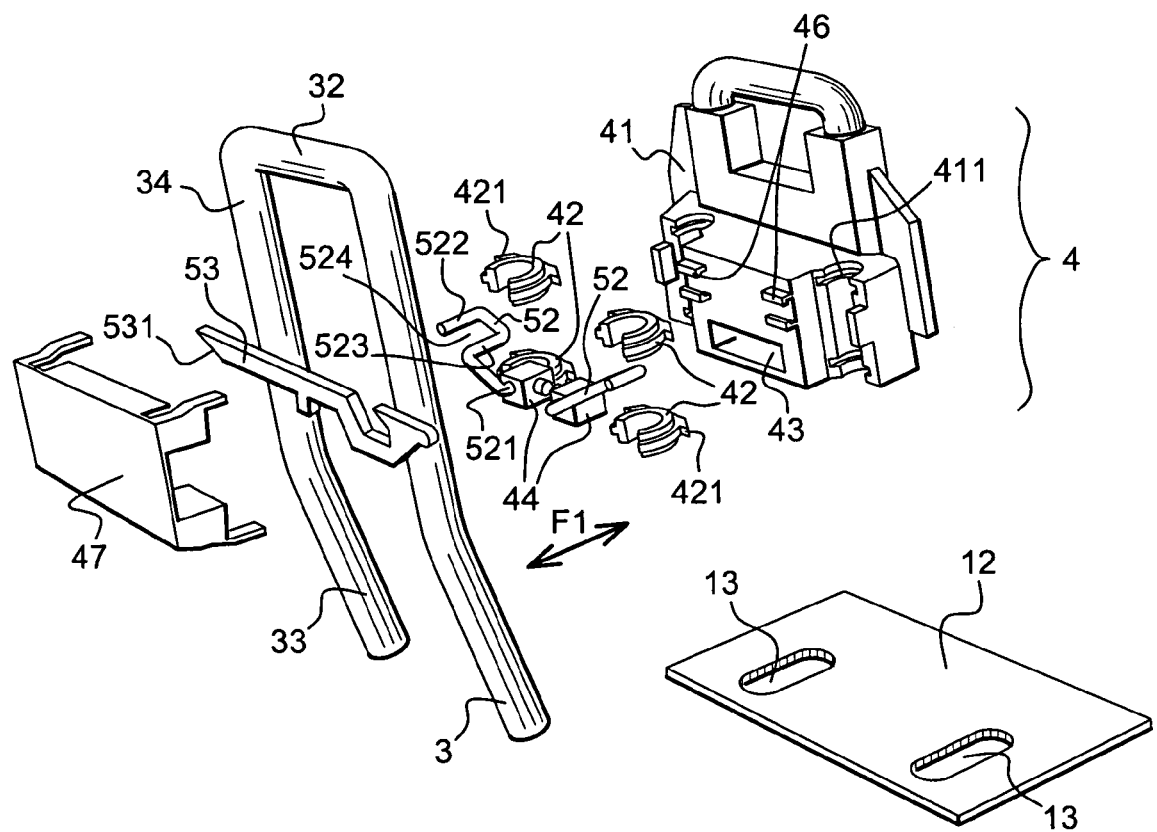

The locking components consist of bent metallic wires 52, as can be seen especially on FIG. 3, each of which includes:

a pivot end or hinge 521 bent at a right angle which is inserted into a hole in a slider 44 perpendicular to the support plate 41 to allow the wire to pivot in relation to the slider in a plane parallel to that of the support plate 41, two bearing elements 522, 523, which extend parallel to each other, also in a direction more or less perpendicular to the support plate 41 and which define, between them, a recess 524 capable of accommodating the stem 3.

Figure 4:
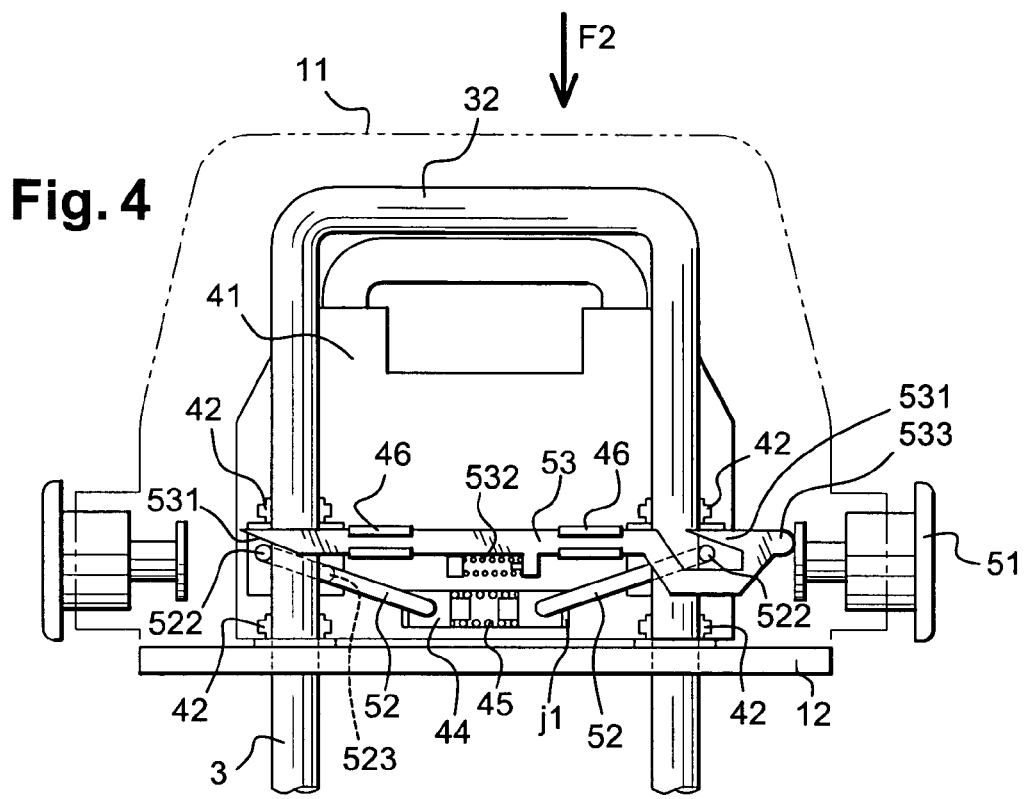
FIG. 4 is a front view of the mechanism in locked position.
Figure 5:
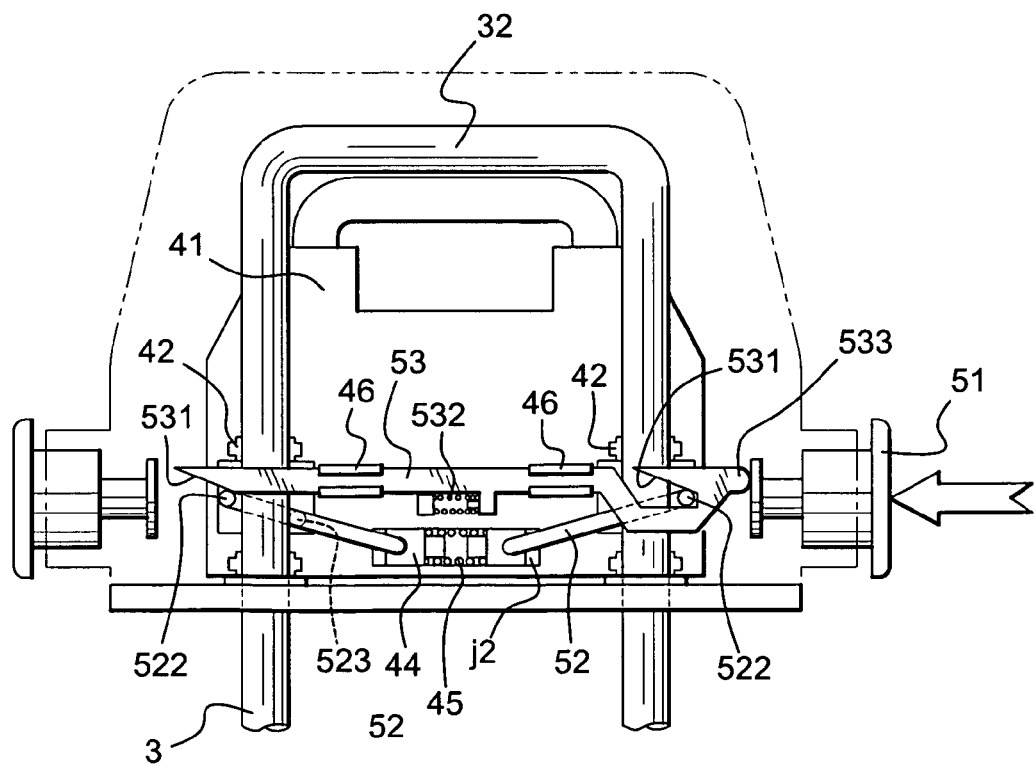
FIG. 5 is a front view of the mechanism in unlocked position.

The distance between the bearing elements 522, 523 is slightly greater than the diameter of the stem 3, so that:

the stem can slide in the recess 524 when the wire extends generally more or less perpendicularly to the stem or at least is less inclined in relation to a perpendicular to the stem, as shown on FIG. 5, and the bearing elements press against the diametrically opposite generatrices of the stem when the wire is maintained inclined in relation to the stem under the effect of the spring 45 which pushes the slider 44 and, therefore, the end of pivot 521 of the wire, towards the said stem, as shown on FIG. 4.

The length of the wires and the dimensions of the housing 43 are determined in such a way that the sliders do not come into contact with the ends of the housing in the locking position so that there is always a certain bearing force of the bearing elements on the stems.

The mechanism also includes unlocking means consisting of a blade 53 installed so as to slide in two slides 46 of the support plate transversally to the stems and parallel to the longitudinal direction of the housing 43. The blade 53 includes two oblique ramps 531 shaped and arranged in such a way so that they act respectively and simultaneously on the ends of the bearing elements 522 of the two wires 52 to move them downwards in the case of the example shown, when the blade is moved transversally. Moreover, a spring 532 acts on the blade to bring it to a position, corresponding to the locking position of the mechanism, where the ramps 531 are not in contact with the wires 52. The knob 51 is shaped so as to act on the end 533 of the blade to move it horizontally, opposing the force of the spring 532.

The assembly process of the mechanism can be easily understood by looking at FIG. 3. First, the split bushes 42 are attached to the support plate 41. The sliders 44 including the locking wires 52 are placed, with the spring 45, in the housing 43, the wires being placed more or less in their final positions. When this first assembly has been done, the support plate thus equipped is placed on the top 34 of stems 3, in direction F1, until the stems 3 clip in the bushes 42, the stems being housed in the recesses 524 of the locking wires 52. The unlocking blade 53 is then slid into the slides 46 of the support plate, and a protective cover 47 covering the guidance and locking means. The assembly thus made up is placed in the casing 11, preequipped with the knob 51 which is positioned opposite the end 533 of the blade 53, and the lower plate 12 is placed by passing the stems 3 through its holes 13 then by attaching it to the casing 11. Then only the padding needs to be added to obtain the completed headrest, ready to be attached to the fixed bushes 21 of the backrest 2 by inserting the lower ends 33 of the stems 3.

The operation of the mechanism can be clearly seen on FIGS. 4 and 5.

FIG. 4 shows the mechanism in locked position. The unlocking blade is pushed back against the knob 51 by the spring 532. The bearing elements 522, 523 of the wires 52 are held against the stems 3 under the effect of the spring 45 which pushes the sliders 44 causing the wires 52 to incline until the simultaneous contact of the two bearing elements on the stem limits this inclination. In this position, there is a clearance j1 between the sliders and the ends of their housing 43.

In this locking position, the headrest is held on the stems by the friction of the bearing elements 522, 523 on the stems. If an additional force is applied downwards to the headrest, in the direction shown by arrow F2, this force will transfer a force to the sliders, via the support plate 41, tending to move them downwards and, therefore, to increase the inclination of the wires 52 in relation to the stems, which consequently increases the gripping force of the wires on the stems and therefore ensures highly efficient locking by the buttressing effect, the gripping force resisting the force on the headrest increasing as this force increases. On the contrary, a force exerted on the headrest in the direction opposite to F2 will have a tendency to reduce the inclination of the wires and consequently to disengage the bearing elements 522 from contact with the stems, and will be sufficient to allow a possible adjustment of the headrest in upwards direction only without acting on the unlocking knob.

FIG. 5 shows the mechanism in unlocked position to allow the headrest to be moved downwards. Pressing the knob 51 moves the unlocking blade 53 opposing the spring 532. The oblique ramps 531 of the blade bear on the ends of the locking wires 52 and push them downwards by moving the wires to a less inclined position in relation to the stems. The bearing elements 522 of the wires 52, located nearest the end of the mechanism, no longer bear on the stems, cancelling the buttressing effect and significantly reducing the frictional forces of the wires against the stems.

Indeed, it can be seen that even in the unlocked position, a frictional force due to the remaining pressure of the bearing elements 523 located near to the centre of the mechanism against the pins remains, this pressure resulting from the pushing force exerted on the wires by the spring 45. However, the friction remaining between the locking wire and the stem remains low as it is exerted on a limited area and metal on metal, and therefore allows the headrest to slide without difficulties. Incidentally, the increase in the clearance j2 between the sliders and the ends of the housing, in relation to locking position clearance j1, can be seen on FIG. 5 this resulting from the movement of the sliders caused by the reduction in the inclination of the wires and the maintained pressure of the bearing elements 523 on the stems.

When the headrest is placed in the position selected by the user, knob 51 is released, the blade 53 moves under the effect of the spring 532 freeing the wires which return to their maximum inclination positions under the effect of the spring 45 and thanks to the fact that, even in the unlocking position, they remain sufficiently inclined so that the horizontal force of the spring 45 is transformed into a pivoting torque of the wires 52 sufficient to increase the inclination of the wires by sliding the bearing elements 523 against the stems if the headrest is then held very firmly or, if not, by causing a minimum sliding movement of the headrest in relation to the stems.

Figure 6:
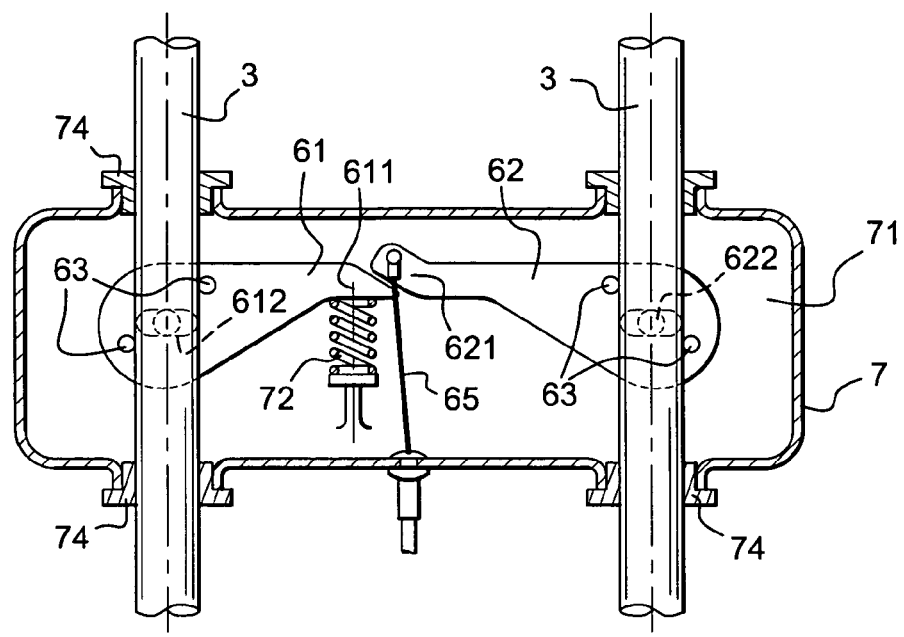
FIG. 6 is a schematic representation of the embodiment variant of the mechanism.
Figure 7:
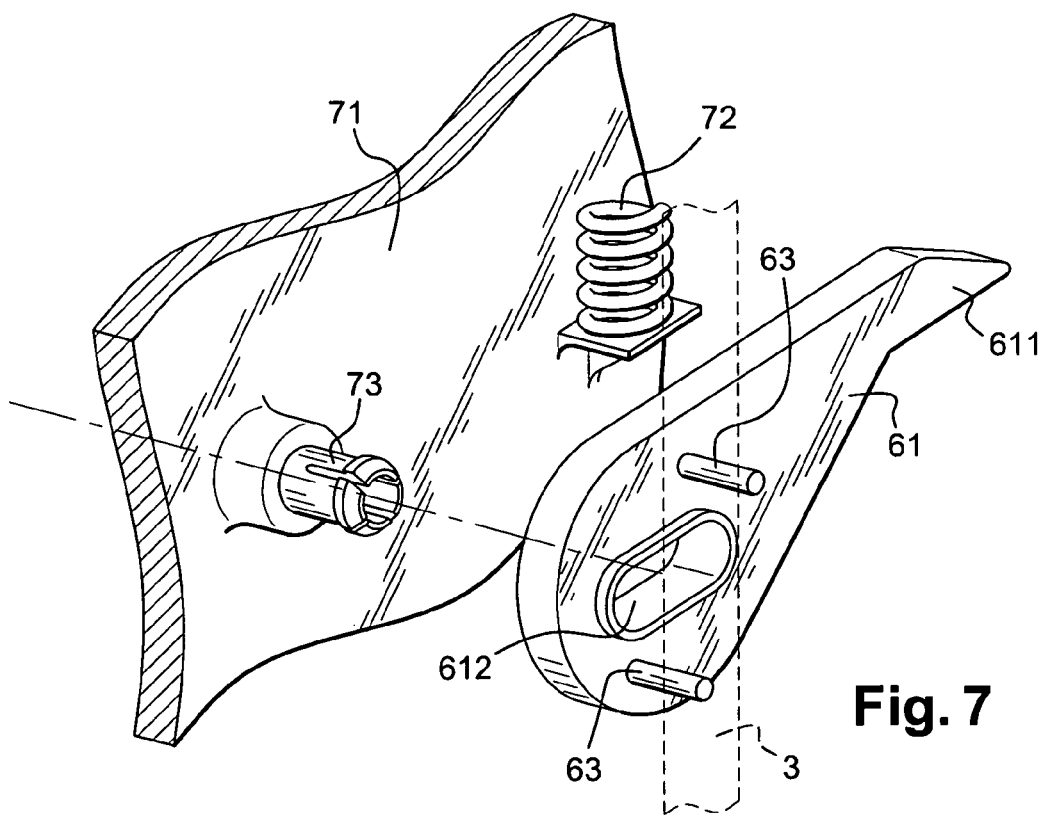
FIG. 7 is a detailed view of a locking component of this variant.

In the variant on FIGS. 6 and 7, the locking means include rockers 61, 62 installed so as to pivot on the support plate 71 and including pins 63 extending perpendicularly to the support plate.

The pins are arranged so as to be applied under pressure against the stems 3 when a rotational torque is applied to the rocker 61 by a spring 72 installed between the rocker and the support plate 71, this torque being transmitted to the rocker 62 by the pressure of an end 611 of the rocker 61 against an end 621 of the rocker 62.

The rockers 61, 62 are hinged on the support plate by clipping a hole 612, 622 over the split studs 73 attached to the support plate. The elongated shape, transversally to the axis of the stems, of the holes 612, 622 allows centring and automatic distribution of the forces of the pins in relation to the stems to allow the stems to be effectively gripped between the said pins and, therefore, the locking of the headrest. The arrangement of the pins 63, extending simply from the rockers makes, between them, a clearance or recess enabling the insertion of the stems laterally between the said pins as can be seen on FIG. 7. In this variant, the stem guide bushes can be in two parts, each half-bush 74 then being preinstalled in a half of the casing 7 a wall of which, extending parallel to the stems, forms the support plate 71 and the assembly of the two half-casings recomprising each bush. Alternatively, the bushes can be previously inserted separately by sliding them on the stems, which is possible, even if the stems are elbowed, if the length of each bush is short. The assembly of the stems on the support plate equipped with the locking means can then be done laterally in compliance with the invention, the bushes being housed, also laterally, in the cutouts provided for this purpose in the half-casing including the support plate 71.

In this variant, the unlocking can be obtained by any means adapted to exert on the rockers a torque opposing the one created by the spring 72 and consequently cancel the gripping force of the pins on the stems. For example a pull device could be used acting on a cable 65 connected to the end 621 of the rocker 62.

The invention is not limited to the embodiments described above only as examples. In particular, the guidance and locking mechanism according to the invention could be used in applications other than a headrest, for example to adjust the position of the front of a seat or armrests, etc.

The invention claimed is:

1. A translation movement guidance mechanism with positional locking for adjustable elements of an automobile vehicle seat including a stem and at least one bush sliding in relation to the stem, the at least one bush being attached to a support plate extending parallel to the stem, and locking means, in fixed position in relation to the at least one bush, including a locking component which has two substantially parallel bearing elements arranged so that, in a locking position of the locking component, the bearing elements exert a gripping force on two diametrically opposite sides of the stem, and the at least one bush being arranged so that the stem can be installed on the support plate in an assembly direction perpendicular to said support plate and the locking component further including, between the two bearing elements, a recess allowing the insertion of the stem into said recess simultaneously with the installation of the stem on the support plate in the assembly direction, wherein said at least one bush comprises elastically deformable split bushes including a split zone so that the bushes can be inserted laterally onto the stem, and the recess of the locking component being aligned with the split zone of the bushes and made to allow the insertion of the stem into the said recess simultaneously with the stem insertion into the bushes.

2. The translation movement guidance mechanism in accordance with claim 1, wherein the locking component consists of a metallic wire, having a hinge, installed so as to pivot in relation to the support plate along an axis orthogonal to said support plate and offset laterally in relation to an axis of the stem and the bushes, the wire being bent so as to comprise said recess between two parallel parts forming the bearing elements and elastically flexible means acting on the wire to keep the wire inclined in relation to the stem.

3. The translation movement guidance mechanism in accordance with claim 2, wherein the metallic wire has a rounded section.

4. The translation movement guidance mechanism in accordance with claim 2, wherein the wire is installed so as to pivot on a slider guided on the support plate transversally to the axis of the stem and the flexible means are arranged so as to push the slider towards the stem.

5. The translation movement guidance mechanism in accordance with claim 4, further comprising unlocking means, arranged so as to push an end of the wire opposite to said hinge on the slider in a direction tending to bring the wire perpendicular to the axis of the stem.

6. The translation movement guidance mechanism in accordance with claim 5, wherein the unlocking means include an unlocking blade installed so as to slide on the support plate perpendicularly to the axis of the stem and including an oblique ramp acting on the end of the wire to move the wire in the axial direction of the stem.

7. The translation movement guidance mechanism in accordance with claim 6, further including a knob acting on an end of the unlocking blade to ensure the unlocking and a spring returning the unlocking blade to the locking position.

8. A translation movement guidance mechanism with positional locking for adjustable elements of an automobile vehicle seat including a stem and at least one bush sliding in relation to the stem, the at least one bush being attached to a support plate extending parallel to the stem, and locking means, in fixed position in relation to the at least one bush, including a locking component which has two substantially parallel bearing elements arranged so that, in a locking position of the locking component, the bearing elements exert a gripping force on two diametrically opposite sides of the stem, and the at least one bush being arranged so that the stem can be installed on the support plate in an assembly direction perpendicular to said support plate and the locking component further including, between the two bearing elements, a recess allowing the insertion of the stem into said recess simultaneously with the installation of the stem on the support plate in the assembly direction, wherein the locking component includes a rocker hinged on the support plate and the bearing elements are formed of two pins attached to the rocker and parallel to a pivoting axis, and flexible means acting on the rocker to apply the pins against the stem.

9. A headrest for an automobile vehicle seat including a guidance mechanism in accordance claim 1.

* * * * *